(12) United States Patent
Singh et al.

(10) Patent No.: US 7,500,358 B2
(45) Date of Patent: Mar. 10, 2009

(54) APPARATUS, SYSTEM, AND METHOD FOR ENHANCING SOOT FILTER PROTECTION

(75) Inventors: Nishant Singh, Columbus, IN (US); Daniel D. Wilhelm, Nashville, IN (US)

(73) Assignee: Fleetguard, Inc, Nashville, TN (US)

( * ) Notice: Subject to any disclaimer, the term of this patent is extended or adjusted under 35 U.S.C. 154(b) by 231 days.

(21) Appl. No.: 11/464,141

(22) Filed: Aug. 11, 2006

(65) Prior Publication Data
US 2008/0034738 A1     Feb. 14, 2008

(51) Int. Cl.
*F01N 3/00*     (2006.01)
(52) U.S. Cl. .............................. 60/295; 60/276; 60/285; 60/286; 60/297; 60/301
(58) Field of Classification Search .................. 60/274, 60/276, 277, 278, 280, 285, 286, 295, 297, 60/311, 301
See application file for complete search history.

(56) References Cited

U.S. PATENT DOCUMENTS

| | | | |
|---|---|---|---|
| 4,608,640 A | * | 8/1986 | Shinzawa et al. ........... 701/101 |
| 7,104,050 B2 | * | 9/2006 | Sato et al. ..................... 60/295 |
| 7,134,275 B2 | | 11/2006 | Tsutsumoto |
| 7,181,909 B2 | * | 2/2007 | Sato et al. ..................... 60/297 |
| 7,249,456 B2 | * | 7/2007 | Schulte et al. ................ 60/295 |
| 7,281,369 B2 | * | 10/2007 | Emi et al. ..................... 60/297 |
| 7,343,738 B2 | * | 3/2008 | Tsutsumoto et al. .......... 60/295 |

* cited by examiner

*Primary Examiner*—Binh Q. Tran
(74) *Attorney, Agent, or Firm*—Kunzler & McKenzie (57) ABSTRACT

An apparatus, system, and method are disclosed for enhancing protection of a soot filter. The method enhances soot filter protection by interpreting a baseline regeneration scheme, estimating whether a set of current soot filter conditions indicate that a regeneration is occurring, and setting an engine operating indicator if an internal combustion engine is operating such that a threshold amount of soot is being generated. The method may continue with incrementing a first counter based on the baseline regeneration scheme and the engine operating indicator, and activating a regeneration request indicator when the first counter reaches a first threshold. The method may further include incrementing a second counter when the regeneration request indicator is active, where the incrementing value for the second counter is based on whether a regeneration is occurring. The method may further include deactivating the regeneration request indicator when the second counter reaches a second threshold.

26 Claims, 9 Drawing Sheets

APPARATUS, SYSTEM, AND METHOD FOR ENHANCING SOOT FILTER PROTECTION

BACKGROUND OF THE INVENTION

1. Field of the Invention

This invention relates to internal combustion engine aftertreatment systems and more particularly relates to protection of soot filters.

2. Description of the Related Art

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, it is desirable to oxidize accumulated particulate matter in a controlled regeneration process before it builds to excessive levels. To oxidize the accumulated particulate matter, temperatures generally must exceed the temperatures typically reached at the filter inlet. Oxidation temperatures will be achieved under normal operating conditions in some applications, although in others, additional methods to initiate regeneration of a diesel particulate filter must be used. In one method, a reactant, such as diesel fuel, is introduced into an exhaust after-treatment system to generate temperature and initiate oxidation of particulate buildup in the filter. Partial or complete regeneration may occur depending on the duration of time the filter is exposed to elevated temperatures and the amount of particulate matter remaining on the filter. Partial regeneration, caused either by controlled regeneration or uncontrolled regeneration, can contribute to irregular distribution of particulate matter across the substrate of a particulate filter.

Controlled regeneration traditionally has been initiated at set intervals, such as distance traveled or time passed. Interval based regeneration, however, has not proven to be totally effective for several reasons. First, regenerating a particulate filter with little or no particulate buildup lessens the fuel economy of the engine and unnecessarily exposes the particulate filter to destructive temperature cycles. Second, if particulate matter accumulates significantly before the next regeneration, backpressure from blockage of the exhaust flow can negatively affect engine performance. In addition, regeneration (intentional or unintentional) of a particulate filter containing large quantities of particulate buildup can become uncontrolled and potentially cause filter failure or the like. Consequently, many particulate filters regenerated on a set interval must be replaced frequently to maintain the integrity of an exhaust gas after-treatment system.

Recently, attempts have been made to estimate the amount of particulate matter accumulated in a particulate filter in order to respond more efficiently to actual particulate buildup, such as, in one widely used method, through differential pressure across a diesel particulate filter. These attempts, however, often do not account for variations in engine operating conditions, sensor noise-to-measurement levels, exhaust flow estimate errors, and unevenly distributed particulate accumulation. In many cases they also integrate errors over time and deviate from real soot loading conditions.

Some of these problems have been overcome by combining model-based soot estimates with sensor-based soot estimates. While this approach has dramatically improved the fuel economy and durability of soot filters in aftertreatment applications, there are still circumstances where the new approaches fail to protect the soot filter.

In some applications, the soot filter heats up and oxidizes soot in the middle of the filter, while the periphery of the soot filter does not achieve a high enough temperature to regenerate completely. While a combined soot load model and sensor approach may yield the correct overall soot loading, the periphery soot concentrations may be building over time and can lead to an uncontrolled regeneration event.

In other applications, the vehicle may generally oxidize soot without any active soot regeneration. For example, the vehicle may generate enough temperature and $NO_2$ that the overall soot loading never requires a high temperature oxygen-based regeneration. However, the steady state soot removal that occurs may not clean the entire filter and such applications are vulnerable to high soot concentrations in local areas within the filter. If the vehicle initiates a high temperature event, which might occur in a long mountain climb for example, the localized concentrations of soot may trigger an uncontrolled regeneration event.

Finally, some applications may spend extended periods of time at low flows. In the current technology, direct soot filter estimators such as differential pressure sensors require significant exhaust flow rates to be reliable even when the soot on the filter is ideally distributed. The mixed sensor and model-based approaches can keep a soot loading estimate reliable for hours after the sensor measurement is no longer reliable, but eventually the confidence in the integrating model must degrade in applications that do not allow any direct soot measurements for long periods.

From the foregoing discussion, it should be apparent that a need exists for an apparatus, system, and method that provide additional protections for soot filters based on the current state of the art. Beneficially, such an apparatus, system, and method, particularly when applied to an exhaust gas aftertreatment system, would enable effective protection and regeneration of the soot filter without degrading the fuel economy of the application or interfering with the base control and regeneration mechanisms of the application.

SUMMARY OF THE INVENTION

The present invention has been developed in response to the present state of the art, and in particular, in response to the problems and needs in the art that have not yet been fully solved by currently available soot filter regeneration control systems. Accordingly, the present invention has been developed to provide an apparatus, system, and method for enhancing soot filter protection that overcome many or all of the above-discussed shortcomings in the art.

An apparatus is provided with a protective regeneration timer, a protective soot estimator, and a diagnostic tool to functionally execute enhanced protection of a soot filter. The protective regeneration timer in the described embodiments includes an operation detection module, a regeneration-start timing module, a regeneration-stop timing module, a regeneration request module, a baseline regeneration module, and a regeneration estimation module. The protective soot estimator in the described embodiments includes a secondary protection module. The diagnostic tool in the described embodiments includes a fuel dosing module, a soot verification module, and a catalyst test module.

The operating detection module may be configured to determine if an internal combustion engine is operating such that a minimum amount of soot is being generated. The baseline regeneration module may interpret a baseline regeneration scheme from an engine controller. The regeneration-start timing module may be configured to utilize the engine operation information and the baseline regeneration scheme to run a regeneration counter. The regeneration-start timing module may set a regeneration request indicator when the regeneration counter reaches a threshold. A regeneration requested by the regeneration-start timing module is called a "protective regeneration."

A regeneration estimation module may be configured to estimate when a regeneration event occurs based on the current conditions in a soot filter. The regeneration-start timing module may be configured to adjust the regeneration counter based on when a regeneration event occurs.

The regeneration-stop timing module may be configured to utilize the regeneration request indicator and the regeneration event information to run a regeneration stop counter. The regeneration-stop timing module may reset the regeneration request indicator when the regeneration stop timer reaches a threshold. A regeneration request module may request a regeneration from a controller when the regeneration request indicator is in the set condition.

The secondary protection module may be configured to provide a protective soot estimate under some operating conditions of the engine. The secondary protection module may be configured to provide the greatest of a sensor-based soot estimate and a baseline controls soot estimate as the protective soot estimate. In one embodiment, the secondary protection module may adjust a trust factor within a controller to manipulate the soot estimate and provide a protective soot estimate.

The fuel dosing module may be configured to test a hydrocarbon doser under some operating conditions. The catalyst test module may be configured to test the efficacy of a catalytic component under some operating conditions. The catalyst test module may use an expected temperature rise and an observed temperature rise to test the catalytic component.

The soot verification module may be configured to test the accuracy of a soot loading estimate. The soot verification module may utilize the current conditions of a soot filter to predict a temperature rise based on soot combustion, and the soot verification module may compare an observed temperature rise to the expected temperature rise to test the soot loading estimate.

In one embodiment, a method comprising a computer program product is presented including the logic to perform enhanced soot filter protection in accordance with the present invention. The computer program product may have operations comprising interpreting a baseline regeneration scheme, estimating whether a set of current soot filter conditions indicate that a regeneration is occurring, and setting an engine operating indicator if an internal combustion engine is operating such that a threshold amount of soot is being generated. The operations may further comprise incrementing a first counter based on the baseline regeneration scheme and the engine operating indicator, and setting a regeneration request indicator when the first timer reaches a first threshold. The operations may further comprise incrementing a second counter when the regeneration request indicator is active, where the incrementing value for the second counter is based on whether a regeneration is occurring. The operations may include resetting the regeneration request indicator when the second timer reaches a second threshold.

In one embodiment, the operations may further comprise resetting the regeneration request indicator when the request indicator is set but a regeneration is not achieved for a long period of time. The operations may include, in one embodiment, performing a diagnostic test when the regeneration indicator is active, where the diagnostic test is one of a fuel doser operation check, a catalytic expected temperature rise check, and a soot filter temperature rise check.

In one embodiment, the operations may further comprise initializing the first counter such that the first protective regeneration for an application occurs more quickly or more slowly than subsequent protective regenerations.

A system is presented for enhanced soot filter protection in accordance with the present invention. The system may comprise an internal combustion engine, and an aftertreatment system fluidly coupled to the internal combustion engine where the aftertreatment system includes a soot filter. The system may further comprise a soot filter protection tool comprising at least one of a protective regeneration counter and a protective soot estimator.

The protective regeneration timer may include an apparatus with modules to functionally execute the soot filter protection timer. The modules in the described embodiments include an operation detection module, a regeneration-start timing module, a regeneration-stop timing module, a regeneration request module, a baseline regeneration module, and a regeneration estimation module. The protective soot estimator in the described embodiments may include a secondary protection module to functionally execute the protective soot estimator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer programmed product may take any form capable of generating a signal, causing a signal to be generated, or causing execution of a program of machine-readable instructions on a digital processing apparatus. A computer programmed product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
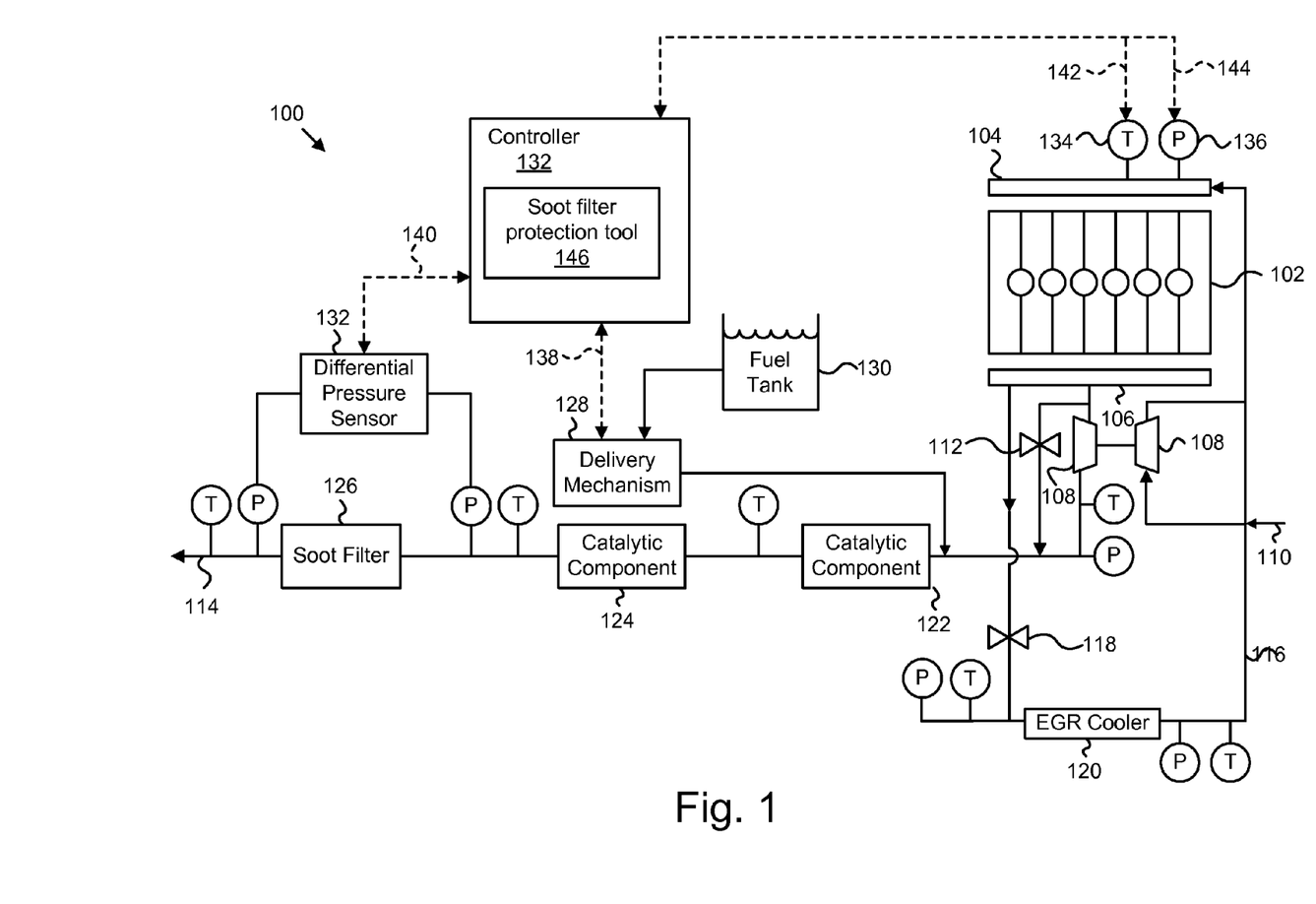
FIG. 1 is a schematic block diagram depicting one embodiment of a system for enhanced soot filter protection in accordance with the present invention.

FIG. 1 is a schematic block diagram depicting one embodiment of a system 100 for enhanced soot filter protection in accordance with the present invention. The system 100 may comprise an internal combustion engine 102. The internal combustion engine 102 may include an intake manifold 104 and an exhaust manifold 106. The system 100 may further include a turbocharger 108 configured to draw in and compress intake air 110, while expanding and receiving energy from the exhaust gas stream 114 off of the exhaust manifold 106. The turbocharger 108 may have a wastegate 112 configured to bypass the turbocharger 108 with some of the exhaust stream at some of the engine 102 operating points.

The system 100 may further include an exhaust gas recirculation (EGR) stream 116 configured to return some of the lower oxygen exhaust gas to the intake manifold 104. The EGR stream 116 may be controlled with an EGR valve 118, and the EGR stream 116 may be cooled in an EGR Cooler 120 before returning to the intake manifold 104. The EGR valve 118 in FIG. 1 is shown on the "hot side," or upstream of the EGR Cooler 120, but the EGR valve 118 could be placed on the "cold side" or in other locations. Without limitation, the EGR stream 116 could also comprise an amount of exhaust gas retained in the cylinder through cylinder valve timing modulation in the engine 102 without any physical EGR stream 116 recirculation.

The exhaust stream 114 may be fluidly coupled to an aftertreatment system before final exhaust to the ambient environment. The aftertreatment system may include a first catalytic component 122, a second catalytic component 124, and a soot filter 126. Various configurations with different numbers and placement of aftertreatment components are known in the art, and all configurations are considered within the scope of the invention. In one embodiment, the first catalytic component 122 comprises a diesel oxidation catalyst configured to clean up unburned hydrocarbons (UHC) from the engine, to combust fuel added from an external doser, and to provide some conversion of $NO_x$ from NO to $NO_2$.

In one embodiment, the second catalytic component 124 comprises a $NO_x$ adsorbing catalyst, configured to adsorb $NO_x$ from the exhaust stream 114 and to later release the $NO_x$ under conditions where the $NO_x$ is converted to $N_2$. In one embodiment, the soot filter 126 is configured to trap and retain soot particles from the exhaust stream 114, and to later allow oxidation of those particles in either a relatively moderate temperature $NO_x$ based reaction or a relatively higher temperature oxygen based reaction. This oxidation of soot particles by either mechanism is hereinafter referred to as "regeneration" within this document.

The system 100 may include a delivery mechanism 128 for a reactant to the exhaust stream 114. The reactant may be a hydrocarbon fuel configured to combust on the catalytic component 122. In such an embodiment, the hydrocarbon fuel may be supplied from a fuel tank 130. In one embodiment, the delivery mechanism 128 may deliver a reagent, such as urea or ammonia, for selective catalytic reduction (SCR). The system 100 may include more than one delivery mechanism 128 in some embodiments.

The system 100 may include a controller 132. The controller 132 may be a controller which controls operations of the engine 102, or it may communicate with a controller (not shown) which separately controls the operations of the engine 102. The controller 132 may communicate 142, 144 with various temperature sensors 134 and pressure sensors 136 throughout the system 100. Some example temperature sensor 134 and pressure sensor 136 locations are shown, but other locations for temperature sensors 134 and pressure sensors 136 may be included in some embodiments. The controller 132 may communicate with the temperature and pressure sensors 134, 136 directly, or through some communication with another controller (not shown) in the system 100. Any given embodiment of the system 100 may not have all of the temperature and pressure sensors 134, 136 indicated on FIG. 1.

The controller 132 may communicate 138 with the delivery mechanism 128. The communication 138 may comprise a command to the delivery mechanism 128 and/or some feedback from the delivery mechanism 128. In one embodiment, the controller 132 may determine when a regeneration event should occur, and the controller 132 may begin commanding the delivery mechanism 128 to dose an amount of fuel according to the temperature and flow rate of the exhaust flow 114. The delivery mechanism 128 may communicate information back to the controller 132, such as how much fuel is being delivered, if a dosing valve does not open properly, and the like.

The controller 132 may communicate 140 with a differential pressure sensor (ΔP sensor) 132. The ΔP sensor 132 may comprise a single differential pressure sensor with a probe upstream and a probe downstream of the soot filter 126. The ΔP sensor 132 may also comprise a single sensor 136 upstream of the soot filter 126, wherein the pressure downstream of the soot filter 126 may be estimated to be at atmospheric pressure. Alternatively, the ΔP sensor 132 may comprise a pair of pressure sensors 136 wherein the differential pressure is estimated to be the difference between the two sensors.

The controller 132 may include a soot filter protection tool 146. The soot filter protection tool 146 may be configured to enhance the protection of the soot filter 146 by requesting regenerations of the soot filter 146 at intervals according to the operations of the engine 102, by providing conservative estimates of the soot loading on the soot filter 126 at times where shortcomings of the basic regeneration scheme for the soot filter 126 are known to apply, and by providing diagnostic information about the system 100 that is otherwise unavailable. The soot filter protection tool 146 may comprise a protective regeneration timer and/or a protective soot estimator.

Figure 2:
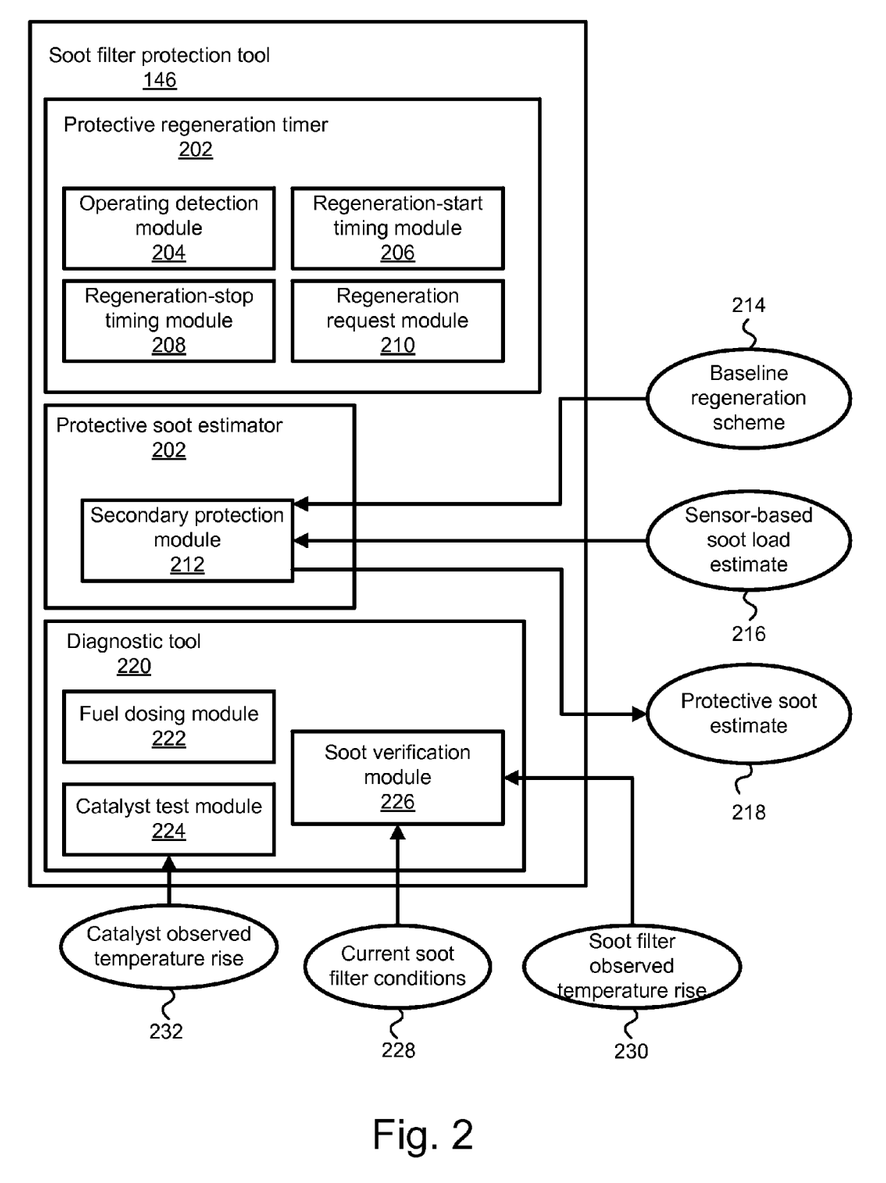
FIG. 2 is a schematic block diagram depicting one embodiment of a soot filter protection tool in accordance with the present invention.

FIG. 2 is a schematic block diagram depicting one embodiment of a soot filter protection tool 146 in accordance with the present invention. The soot filter protection tool 146 may comprise a protective regeneration timer 202, a protective soot estimator 202, and a diagnostic tool 220.

The protective regeneration timer 202 may be configured to intelligently trigger occasional regeneration events to ensure the soot filter 126 does not build up soot concentrations, for example in the periphery of the soot filter 126, that could cause an uncontrolled regeneration event. The protective regeneration timer 202 may comprise an operation detection module 204 configured to set an engine operating indicator if the internal combustion engine 102 is operating such that a threshold amount of soot is being generated. The operation detection module 204 may be configured according to the information available in a particular system 100.

In one example, if an engine speed indication from the engine controller (see description for FIG. 1) is available, the operation detection module 204 may set an engine operating indicator if the engine speed exceeds a threshold value to indicate that the engine is producing soot. If a soot estimation is available, for example see the patent application Ser. No. 11/227,857, "APPARATUS, SYSTEM, AND METHOD FOR ESTIMATING PARTICULATE PRODUCTION," incorporated herein by reference, then a threshold soot production value may be used—for example anything above 0.1 grams of soot per hour might be considered enough for setting the engine operating indicator. The purpose of the engine operating indicator is that while the engine is operating and soot is being generated, the uncertainty of the soot concentration in the soot filter, especially in the periphery, is growing. With that purpose available, it is within the skill of one in the art to set an engine operating indicator based on a wide range of parameters, including without limitation a speed, flow rate, pressure, or temperature somewhere within the system 100, and all of these embodiments are contemplated within the scope of the invention.

The protective regeneration timer 202 may further comprise a regeneration-start timing module 206 configured to increment a first counter based on the engine operating indicator, and to set a regeneration request indicator when the first counter reaches a first threshold. In one embodiment, the first threshold comprises a time, the first counter comprises a timer, and the regeneration-start timing module 206 increments the first counter until the first threshold time is reached.

For example, the first threshold may be set to one month, such that each month of engine operating indicator time, the first threshold will be reached and the regeneration request indicator will be set. The first threshold should be set according to the needs of the application and the capabilities of the basic regeneration scheme of the system 100. For example, if field testing data shows that the periphery soot loading can be concentrated to levels supporting uncontrolled regeneration within two months after a complete regeneration, then the first threshold should be set to a value less than two months. While the value for the first threshold cannot be specified in advance, one of skill in the art, using the ordinary experience required to prepare an aftertreatment system for production, can determine an appropriate value for the first threshold.

The protective regeneration timer 202 may further comprise a regeneration-stop timing module 208 configured to increment a second counter based on the set regeneration request indicator, and to reset the regeneration request indicator when the second counter reaches a second threshold. In one embodiment, the second threshold comprises a time, the second counter comprises a timer, and the regeneration-stop timing module 208 increments the second counter until the second threshold time is reached.

For example, second threshold may be set to one hour. In the example, the regeneration-start timing module 206 may activate the regeneration request indicator, and the regeneration-stop timing module 208 begins incrementing the second counter. When the second counter reaches the second threshold, the regeneration-stop timing module 208 resets the regeneration request indicator.

The protective regeneration timer 202 may further comprise a regeneration request module 210. The regeneration request module 210 may request a regeneration event based on the regeneration request indicator. In one embodiment, the regeneration request module 210 requests a regeneration when the regeneration request indicator is set. The actions to request a regeneration depend upon the application. For example, the regeneration request module 210 may communicate a regeneration request to an engine controller (not shown), or to another software component within the controller 132. In one embodiment, the regeneration request module 210 may activate the delivery mechanism 128 based on the regeneration request indicator.

The protective regeneration timer 202 may further comprise a protective soot estimator 202. The protective soot estimator may comprise a secondary protection module 212. The secondary protection module 212 may be configured to interpret a baseline regeneration scheme 214. The baseline regeneration scheme 214 may be interpreted from user inputs defining the baseline regeneration scheme 214, or the baseline regeneration scheme 214 may be interpreted from a software component within the controller 132 or an engine controller (not shown). The baseline regeneration scheme 214 may comprise the parameters and logic necessary for the secondary protection module to override or modify the soot loading estimation within the application.

For example, the application may have a parameter that represents the soot loading estimation, and the secondary protection module 212 may interpret the baseline regeneration scheme 214 by reading that parameter name. In one example, the baseline regeneration scheme 214 may be a combined sensor and model-based soot load estimation similar to that taught in patent application Ser. No. 11/227,320 "APPARATUS, SYSTEM, AND METHOD FOR PROVIDING COMBINED SENSOR AND ESTIMATED FEEDBACK," incorporated herein by reference, and the the secondary protection module 212 may interpret the baseline regeneration scheme 214 by reading the parameter name for the trust factor. In the example, the trust factor selects the soot load estimation to be dominated by a sensor or a by a model.

The secondary protection module 212 may be configured to use a sensor-based soot load estimate if the sensor-based soot load estimate indicates a higher soot loading than the baseline soot loading estimate. Using a sensor-based soot load estimate may comprise providing a protective soot estimate 218 for use within an engine controller or another software component within the controller 132.

For example, if the sensor-based soot load estimate indicates 100 grams of soot in a soot filter 126, and the mixed sensor and model estimate from the patent application Ser. No. 11/227,320 indicates a soot loading of 60 grams, the secondary protection module 212 may be configured to provide a protective soot estimate 218 of 100 grams. Providing a protective soot estimate 218 may comprise overriding a soot estimate value within an engine controller, or providing the protective soot estimate 218 may comprise manipulation of the trust factor such that the sensor-based soot load estimate is more heavily favored than it would be in the same circumstances within the baseline regeneration scheme 214.

In one example, the baseline regeneration scheme 214 may use a sensor and a model to estimate soot loading on the soot filter 126, and the scheme 214 may utilize a trust factor to negotiate between the sensor and the model. In one embodiment, sensor may be known to become unreliable during a high temperature regeneration event because rat-holing and burning of the soot layer causes a complex differential pressure to soot loading correlation.

Figure 3A:
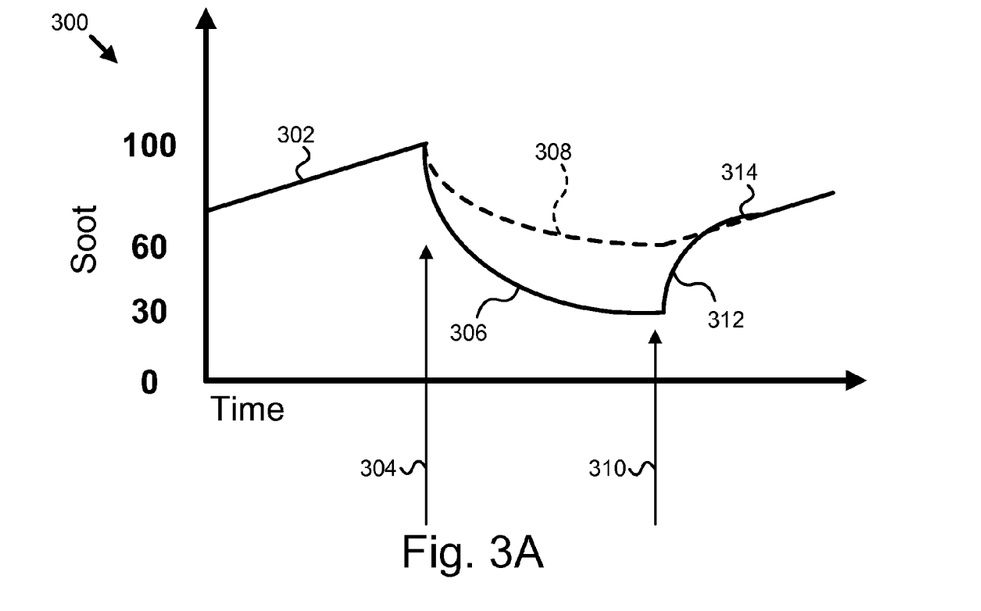
FIG. 3A is an illustration of a simulated successful regeneration event in accordance with the present invention.

Referring to FIG. 3A, one example of a soot filter 126 building soot over time is illustrated on curve 302. A high temperature regeneration event occurs at point in time 304. The differential pressure characteristic often seen during a high temperature regeneration event is shown on curve 306. The curve 308 shows a model-based soot loading change during a regeneration event, which will follow the actual soot loading on the soot filter in normal circumstances. The regeneration event is stopped as point in time 310, and as rat-holes in the soot layer quickly fill back in, the sensor-based soot load estimate travels the curve 312 and returns to the model-based curve 314. The sensor-based soot load estimate tracks lower than the model-based soot loading, and the true soot loading, during regeneration events except at the highest flow rates within a given application. Therefore, the secondary protection module 212 for the operational example of FIG. 3A would not provide a protective soot estimate 218 or use the sensor-based soot load estimate.

Figure 3B:
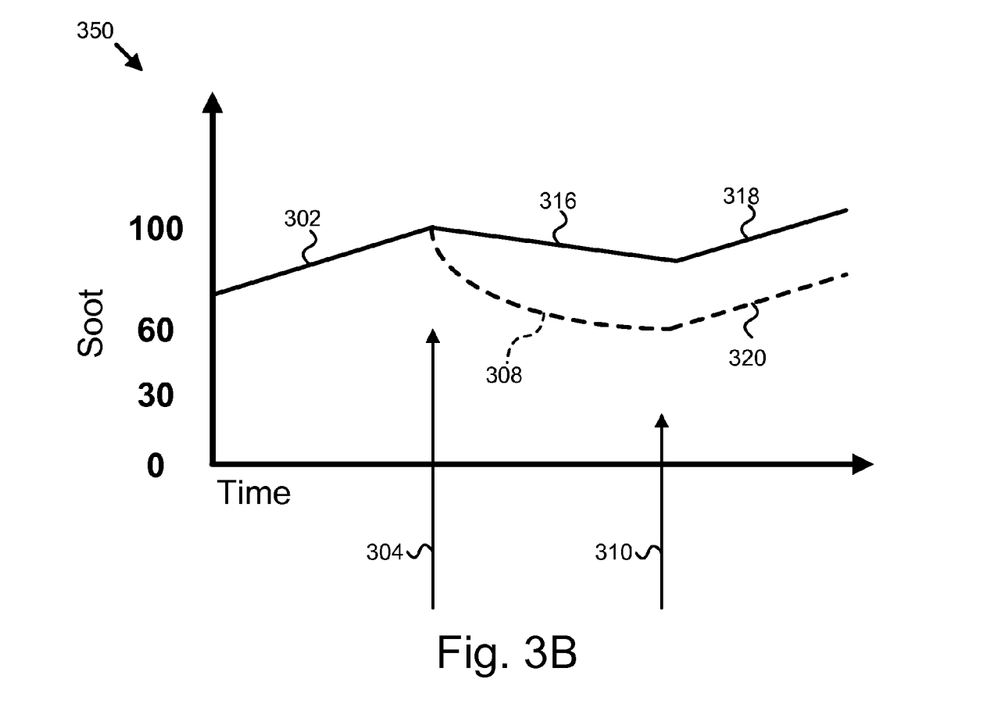
FIG. 3B is an illustration of a simulated partially-failed regeneration event in accordance with the present invention.

Referring to FIG. 3B, one example of a soot filter 126 building soot over time is illustrated on curve 302. A high temperature regeneration event occurs at point in time 304. The differential pressure characteristic during the regeneration event is shown on curve 316, while the model-based characteristic is shown on curve 308. If the model inputs for FIG. 3B are identical to the model inputs for FIG. 3A, the curve 308 will be the same curve. However, something happened in the system 100 that made the model invalid in FIG. 3B, because if significant soot had actually been regenerated the sensor curve would have resembled 306 rather than 316. In the example, the sensor based estimate resumes filling soot along curve 318, while the model based estimate resumes filling soot along curve 320.

There are several potential causes for this, including at least a simplified model that may not use oxygen concentration in the exhaust gas 214 as an input, a degraded catalyst on the soot filter 126, and water splash on the soot filter 126 causing cooling that is not observed by whatever temperature sensor(s) is(are) used by the model. Also, the engine 102 could be experiencing a failure or operating condition causing the engine 102 to generate more soot than a soot estimator is currently predicting. Whatever the true cause for the model failure in FIG. 3B, many failure modes of the sensor based model, for example non-uniform soot distribution in the soot filter 126, tend to make the sensor based model read lower than the actual soot, so when the sensor based model reads higher it is likely to be correct. The secondary protection module 212 for the operational example of FIG. 3B may respond by providing a protective soot estimate 218. Providing a protective soot estimate 218 may comprise using the sensor based soot estimate as indicated by curve 316, or setting the trust factor to strongly favor the sensor based soot estimate over the model-based estimate while the sensor based estimate reads higher than the combined estimate.

Referring to FIG. 2, the protective regeneration timer 202 may further comprise a diagnostic tool 220. The diagnostic tool 220 may be configured to perform a diagnostic test when the regeneration request indicator is active. The diagnostic tool 220 may comprise a fuel dosing module 222, a catalyst test module 224, and a soot verification module 226.

The fuel dosing module 222 may be configured to determine whether the delivery mechanism 128 is working properly. The fuel dosing module 222 may check diagnostic signals from the delivery mechanism 128, check response times until a temperature rise occurs in the catalytic component 122, or check for voltages and electronic signals consistent with a properly functioning delivery mechanism 128. The operations of the fuel dosing module 222 are significant, because in some applications that will regenerate the soot filter 126 without active regeneration, the delivery mechanism 128 may not be tested for long intervals, or specific tests must be performed with the delivery mechanism 128 that burn hydrocarbons without any regeneration benefit to the soot filter 126. The fuel dosing module 222 may set a diagnostic indicator based upon the checks of the delivery mechanism 128.

The catalyst test module 224 may be configured to observe the temperature rise 232 across the catalytic component 122 and compare the observed temperature rise 232 to an expected temperature rise. In one embodiment, the expected temperature is estimated at steady state using the exhaust flow 114 amount and heat capacity, the amount of hydrocarbons injected by the delivery mechanism 128, the heat of combustion of the hydrocarbons, and the expected hydrocarbon conversion efficiency—i.e. the percentage of hydrocarbons that should burn—at the current temperature of the exhaust flow 114 upstream of the catalytic component 122.

Because of heat losses to the environment, the heat capacity of the catalyst component 122 substrate, and temperature sensor response times, the catalyst test module 224 may be configured to wait several seconds before comparing the estimated and observed temperatures. In one embodiment, the catalytic component 122 takes about 15 seconds to reach the expected temperature, but one of skill in the art can derive the time delay for a particular application with a few simple tests at various ambient temperatures. In one embodiment, the length of the several second delay before comparing the estimated and observed temperatures varies at run-time and is based upon ambient temperature and exhaust flow rate.

The operations of the fuel dosing module 222 are significant, because in some applications that will regenerate the soot filter 126 without regeneration, the catalytic component 122 may not be tested for long intervals, or specific tests must be performed that burn hydrocarbons on the catalytic component 122 without any regeneration benefit to the soot filter 126. A test indicating an observed temperature rise 232 significantly lower than the expected temperature rise may indicate a degraded catalyst. The catalyst test module 224 may set a diagnostic indicator based upon the checks of the catalytic component 122.

The soot verification module 226 may be configured to observe the temperature rise across the soot filter 126 and compare the observed temperature rise to an expected temperature rise. In one embodiment, the expected temperature rise is estimated from the rate of temperature generation within the soot filter 126, the exhaust flow 114, and the temperature of the exhaust flow 114 upstream of the soot filter 126. The rate of temperature generation within the soot filter 126 can be calculated from the expected oxidation rate of soot, plus the expected amount of hydrocarbon injected by the delivery mechanism 128 that should slip to the soot filter 126 and burn within the soot filter 126. For example, if the catalytic component 122 is expected to burn 85% of the hydrocarbons injected, and the soot filter 126 is expected to burn 90% of the hydrocarbons that slip to the soot filter 126, then (ignoring the catalytic component 124) the soot filter 126 should be expected to burn (0.9*0.15*1000=) 135 parts of fuel per 1000 parts of fuel injected by the delivery mechanism 128.

The expected oxidation rate of soot can be estimated according to the current soot filter conditions 228. The conditions which may be relevant are the overall soot loading, the concentration of available oxidizing agents, and the temperature of the soot filter 126. Various methods of estimating the oxidation rate of soot are known in the art, and the principles of patent application Ser. No. 11/227,320, "APPARATUS, SYSTEM, AND METHOD FOR ESTIMATING PARTICULATE CONSUMPTION," incorporated herein by reference, may be helpful for this calculation.

Because of heat losses to the environment, the heat capacity of the soot filter 126 substrate, and temperature sensor response times, the soot verification module 226 may be configured to wait several seconds before comparing the estimated and observed temperatures. In one embodiment, the soot filter 126 takes about 30 seconds to reach the expected temperature, but one of skill in the art can derive the time delay for a particular application with a few simple tests at various ambient temperatures. In one embodiment, the length of the several second delay before comparing the estimated and observed temperatures varies at run-time and is based upon ambient temperature and exhaust flow rate.

The operations of the soot verification module 226 are significant, because there may be few opportunities to make direct measurements of the soot in the soot filter 126. A higher than expected observed temperature rise 230 may indicate that more soot was retained on the soot filter 126 than indicated by the main soot estimate. A lower than expected observed temperature rise 230 may indicate that less soot was retained on the soot filter 126 than indicated by the main soot estimate. In one embodiment, the frequency of protective regeneration events may be increased, if the soot verification module 226 indicates that the main soot estimator is underestimating soot, by decreasing the maximum value of the first threshold used by the regeneration-start timing module 206. Likewise, in one embodiment, the frequency of protective regeneration events may be decreased, if the soot verification module 226 validates that the main soot estimator is properly estimating soot, by increasing the maximum value of the first threshold used by the regeneration-start timing module 206.

Figure 4:
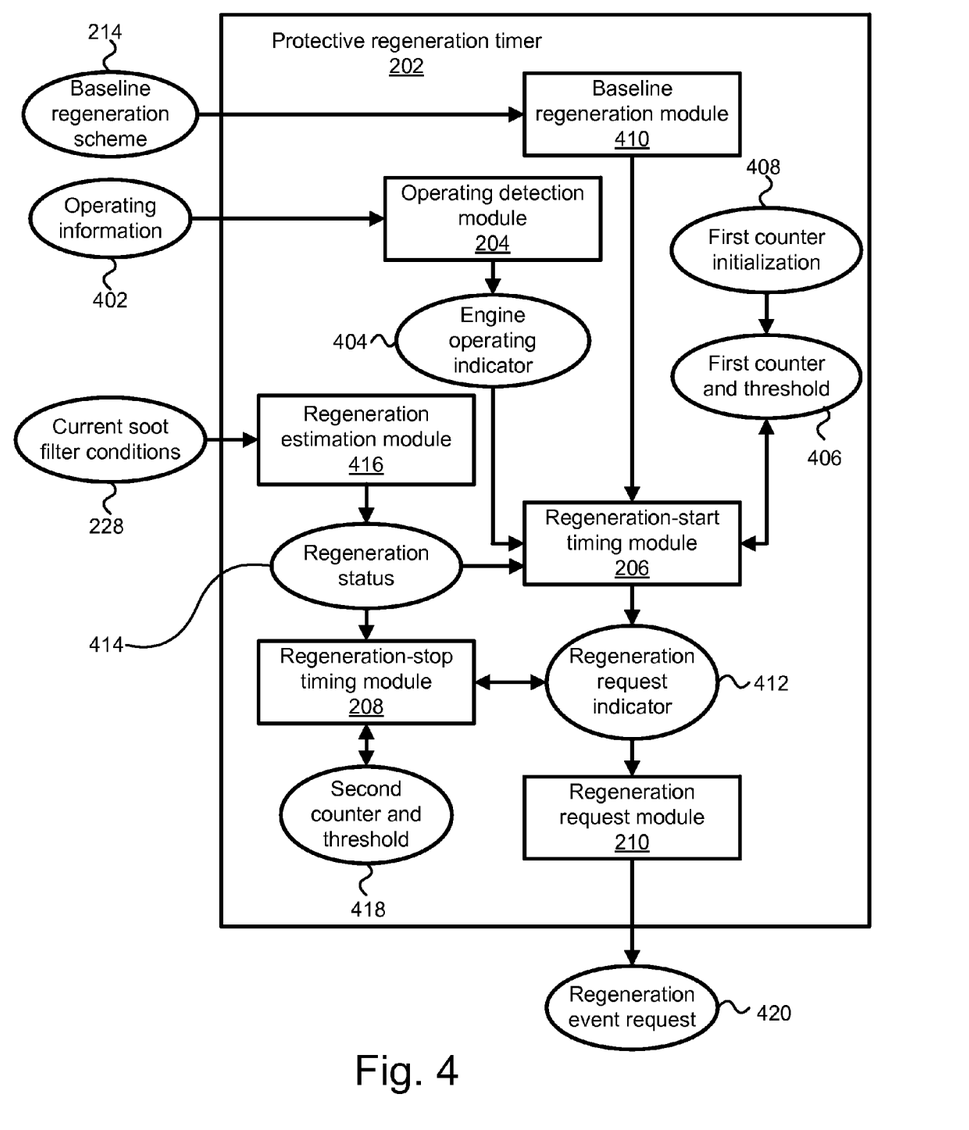
FIG. 4 is a schematic block diagram depicting one embodiment of a protective regeneration timer in accordance with the present invention.

FIG. 4 is a schematic block diagram depicting one embodiment of a protective regeneration timer 202 in accordance with the present invention. The protective regeneration timer 202 may comprise a baseline regeneration module 410, an operating detection module 204, a regeneration estimation module 416, a regeneration-start timing module 206, a regeneration-stop timing module 208, and a regeneration request indicator 412.

The baseline regeneration module 410 may be configured to interpret a baseline regeneration scheme 214. The regeneration-start timing module 206 may be configured to increment the first counter 406 based on the baseline regeneration scheme 214. For example, the baseline regeneration scheme 214 may be a timer-based regeneration scheme, and the regeneration-start timing module 206 may increment the first counter 406 by zero, in effect disabling the protective regeneration feature.

In one embodiment, the baseline regeneration scheme 214 may include an indication that the application may have infrequent opportunities to actively regenerate the soot filter 126—see, for example, patent application Ser. No. 12/039,614, "APPARATUS, SYSTEM, AND METHOD FOR DETERMINING A REGENERATION AVAILABILITY PROFILE," incorporated herein by reference—and the regeneration-start timing module 206 may increment the first counter 406 by a relatively large number, causing the protective regeneration timer 202 to provide a regeneration event request 420 relatively frequently. In a further example, the baseline regeneration scheme 214 may include a parameter indicating that all regeneration attempts should be suspended—for example while a truck is parked at a loading dock—and the regeneration-start timing module 206 may increment the first counter 406 by zero during that time, thereby preventing the protective regeneration timer 202 from generating a regeneration event request 420. Other uses of the baseline regeneration module 410 interpreting the baseline regeneration scheme 214 are apparent to one of skill in the art based on the presented examples, and all of these uses are contemplated within the scope of the invention.

The protective regeneration timer 202 may include an operating detection module 204 configured to receive operating information 402. The operating information 402 may include a determination of whether an internal combustion engine 102 is operating such that a threshold amount of soot is being generated. Alternatively, the operating information 402 may include enough information for the operating detection module 204 to estimate whether the engine 102 is operating such that a threshold amount of soot is being generated. The operating detection module 204 may be configured to set an engine operating indicator if the engine 102 is operating such that a threshold amount of soot is being generated.

The protective regeneration timer 202 may include a regeneration-start timing module 206. The regeneration-start timing module 206 may be configured to increment a first counter 406 based on the engine operating indicator 404 and the baseline regeneration scheme 214. The regeneration-start timing module 206 may be further configured to set a regeneration request indicator 412 if the first counter 406 reaches a threshold 406. The first counter 406 may be configured to reset to a value if the regeneration-start timing module 206 sets the regeneration request indicator 412.

In a further embodiment, the first timer 406 may be set to a first counter initialization value 408 the first time the counter 406 operates. For example, the first counter initialization 408 may be a value lower than the standard reset value for the first counter 406, thereby making the first protective regeneration event request 420 take a relatively long period. This would be useful in an application where a brand new soot filter 126 may take a relatively long period of time to begin building up soot in the periphery. In another example, the first counter initialization 408 may be a value higher than the standard reset value for the first counter 406, thereby making the first protective regeneration event request 420 take a relatively short period. This would be useful in an application where a brand new soot filter 126 should experience a relatively early "degreening" regeneration event.

The protective regeneration timer 202 may further comprise a regeneration estimation module 416 configured to estimate whether a set of current soot filter conditions 228 indicate that a regeneration is occurring. The regeneration estimation module 416 may communicate the occurrence of a regeneration through a regeneration status 414. The regeneration-start timing module 206 may be configured to increment the first counter 406 with a first negative value when the regeneration estimation module 416 indicates that a regeneration is not occurring. The regeneration-start timing module 206 may be configured to increment the first counter 406 with a first positive value when the regeneration estimation module 416 indicates that a regeneration is occurring. The first positive value may be calculated from the set of current soot filter conditions 228. The use of a positive value to increment the first counter 406 represents soot removal from the periphery of the soot filter 126 and therefore the need for a protective regeneration of the soot filter 126 may decrease during that period.

Figure 5:
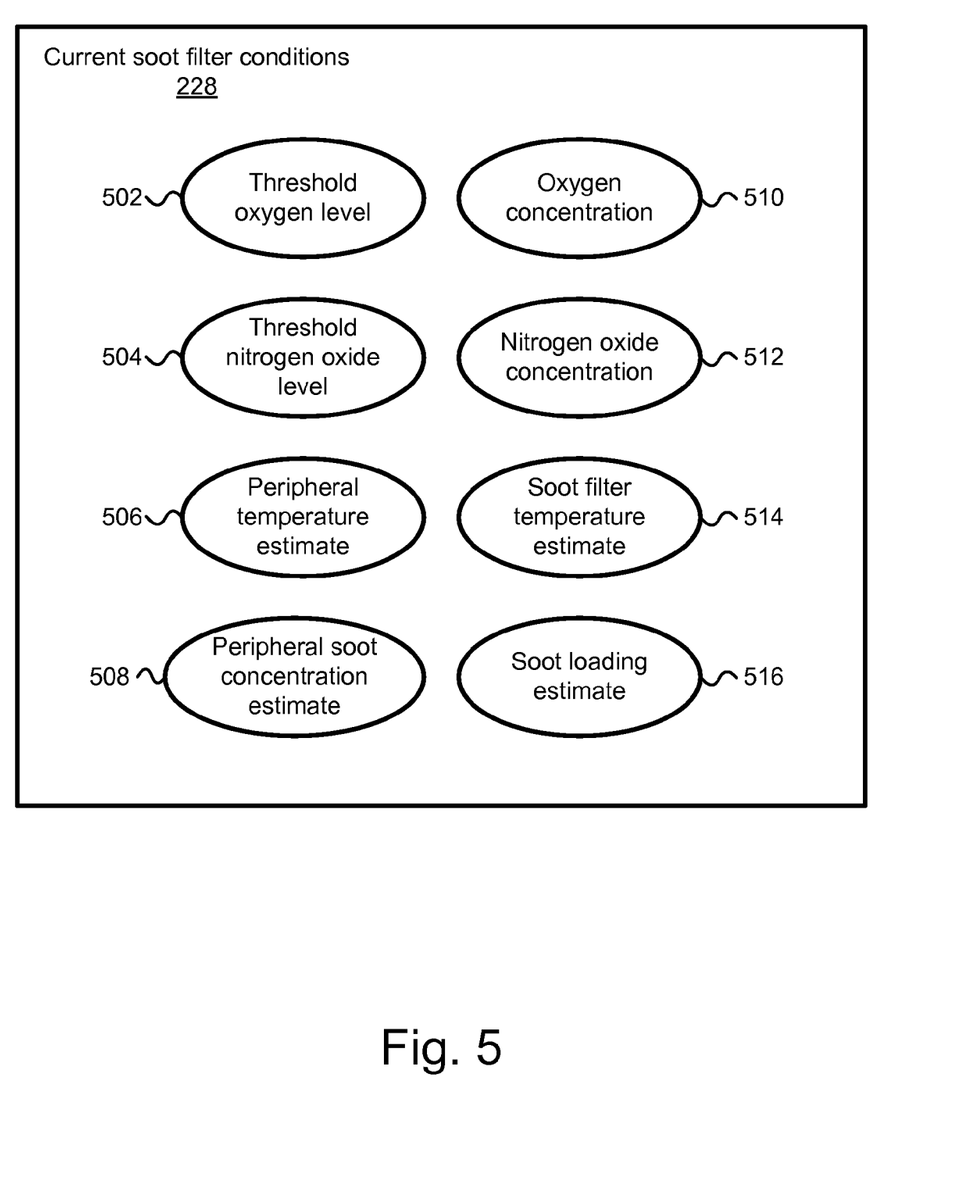
FIG. 5 is an illustration of a set of current soot filter conditions in accordance with the present invention.

Referring to FIG. 5, the set of current soot filter conditions 228 may comprise an oxidizing agent level, for example a threshold oxygen level 502, an oxygen concentration 510, a threshold nitrogen oxide level 504, and a nitrogen oxide concentration 512. The set of current soot filter conditions 228 may further comprise a peripheral temperature estimate 506, a peripheral soot concentration estimate 508, a soot filter temperature estimate 514, and a soot loading estimate 516.

A temperature estimate of the soot filter periphery is within the skill of one in the art, but a simple estimate using a weighted average between the bulk soot filter temperature and the ambient air temperature is provided for clarity and ease of use of the invention. For example, the periphery soot filter 126 temperature could be estimated as $T_p = \alpha*(T_{sf} - T_{amb}) + T_{amb}$ where $T_p$ is the temperature of the soot filter 126 periphery, $T_{sf}$ is the bulk soot filter temperature, and $T_{amb}$ is the ambient air temperature. An $\alpha$ of 0.5 will work well in many cases, and for insulated soot filters 126 the $\alpha$ may be even slightly higher. One of skill in the art can quickly determine a more accurate $\alpha$ value for a given application with a simple experiment. One of skill in the art could also quickly build a lookup table of $\alpha$ values based on $T_{sf}$, $T_{amb}$, and exhaust flow 114 rate if great accuracy were required for a given application. Great accuracy would be required only in applications where both fuel economy and soot filter 126 protection were critical.

A peripheral soot concentration estimate 508 is likewise within the skill of one in the art using the estimated soot filter 126 periphery temperature and a model-based soot estimator. In one embodiment, a simplified model may be used comprising a temperature-based estimate of soot oxidation rate, combined with a threshold oxygen level required for the reaction to occur. For example, the model may require a minimum 5% oxygen in the exhaust gas, with a reaction rate varying exponentially with temperature. Feedback may not be available for a peripheral soot concentration estimate 508, so the uncertainty of the model may grow with time, and this growing uncertainty may be used to set the first counter threshold 406. For example, if the peripheral soot concentration estimate 508 uncertainty exceeds an acceptable level within two weeks, the first counter threshold 406 may be a time with a threshold of less than two weeks. The peripheral soot concentration estimate 508 may be reset after a successful protective regeneration event.

Referring to FIG. 4, the protective regeneration timer 202 may further comprise a regeneration-stop timing module 208. The regeneration-stop timing module 208 may be configured to increment a second counter 418 based on the active regeneration request indicator 412. The regeneration-stop timing module 208 may be further configured to increment the second counter 418 with a second positive value when the regeneration estimation module 416 estimates that a regeneration is occurring, and to increment the second counter 418 with a second negative value when the regeneration estimation module 416 estimates that a regeneration is not occurring.

In one embodiment, when the regeneration-stop timing module 208 increments the second counter 418 with a second negative value, the regeneration-stop timing module 208 does not increment the second counter 418 below zero or a beginning value. The positive increment represents soot being successfully oxidized off of the soot filter 126, while the negative increment represents a failure to oxidize soot from the soot filter 126, and corresponding buildup of soot back on the soot filter 126. The second positive value may be a value calculated from the set of current soot filter conditions 228. If the second counter 418 reaches a second counter threshold 418, the regeneration-stop timing module 208 may be configured to reset the regeneration request indicator 412. The second timer threshold 418 should be set to a value consistent with the purpose of regenerating the soot filter 126 long enough to completely regenerate the soot filter 126, including substantially cleaning soot from the periphery of the soot filter 126. This number will be known to those of skill in the art depending upon the specific application at interest, but a minimum number of 30-60 minutes is typical for many applications.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
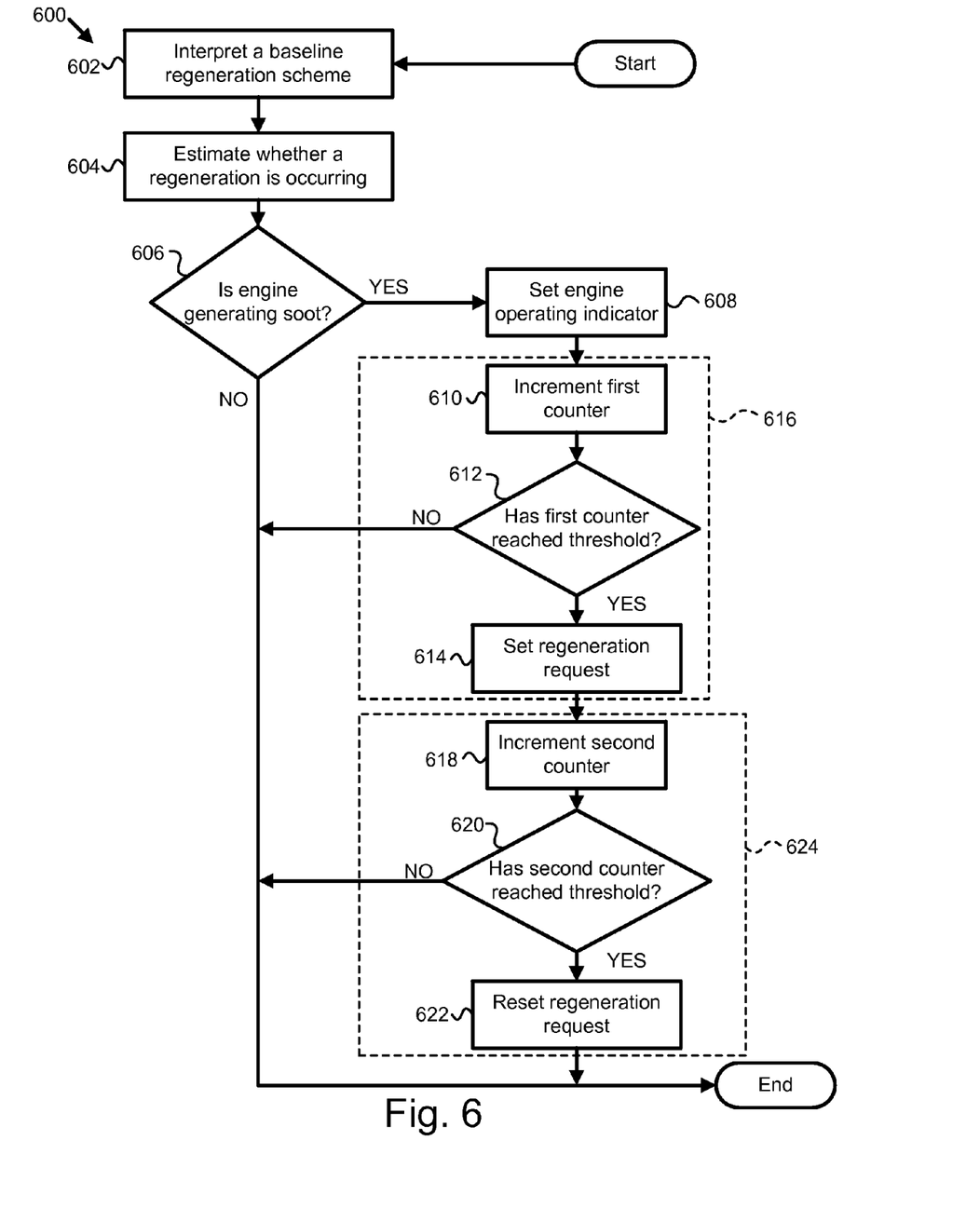
FIG. 6 is a schematic flow chart illustrating one embodiment of a method for enhancing soot filter protection in accordance with the present invention.

FIG. 6 is a schematic flow chart illustrating one embodiment of a method 600 for enhancing soot filter protection in accordance with the present invention. The method may a computer programming product configured to perform the operations of the method. The method 600 may begin with the baseline regeneration module 410 interpreting 602 a baseline regeneration scheme. The regeneration estimation module 416 may estimate 604 whether a set of current soot filter conditions 228 indicate that a regeneration is occurring. The operation detection module 204 may then set 608 an engine operating indicator 404 if the internal combustion engine 102 is operating such that a threshold amount of soot is being generated. If the engine operating indicator 404 indicates the engine 102 is not generating soot, the method 600 may end.

The method 600 may proceed with the operation 616 of a regeneration-start timer. If the engine operating indicator 404 indicates the engine 102 is generating soot, the regeneration-start timing module 206 may increment 610 a first counter 406. The first counter 406 may begin set at a value of the first counter 406 from a previous execution of the method 600. The regeneration-start timing module 206 may check 612 if the first counter 406 has reached a threshold. If not, the method 600 may end. If the first timer 406 has reached a threshold, the regeneration-start timing module 206 may set 614 a regeneration request indicator 412.

The method 600 may proceed with the operation 624 of a regeneration-stop timer. Note that if the operation 624 of the regeneration-stop timer is active in one execution of the method 600, the operation 624 regeneration-stop timer may remain active in a subsequent execution of the method 600 without operating 616 the regeneration-start timer. The logic to execute this feature is obvious to one of skill in the art, and would clutter FIG. 6 unnecessarily, so it is not shown in FIG. 6.

The regeneration-stop timing module 208 may increment 618 a second counter 418. The second counter 418 may begin set at a value of the second timer 418 from a previous execution of the method 600. The regeneration-stop timing module 208 may check 620 whether the second counter 418 has reached a threshold. If not, the method 600 may end. If the second counter 418 has reached a threshold, the regeneration-stop timing module 208 may reset 622 the regeneration request indicator 412.

Figure 7:
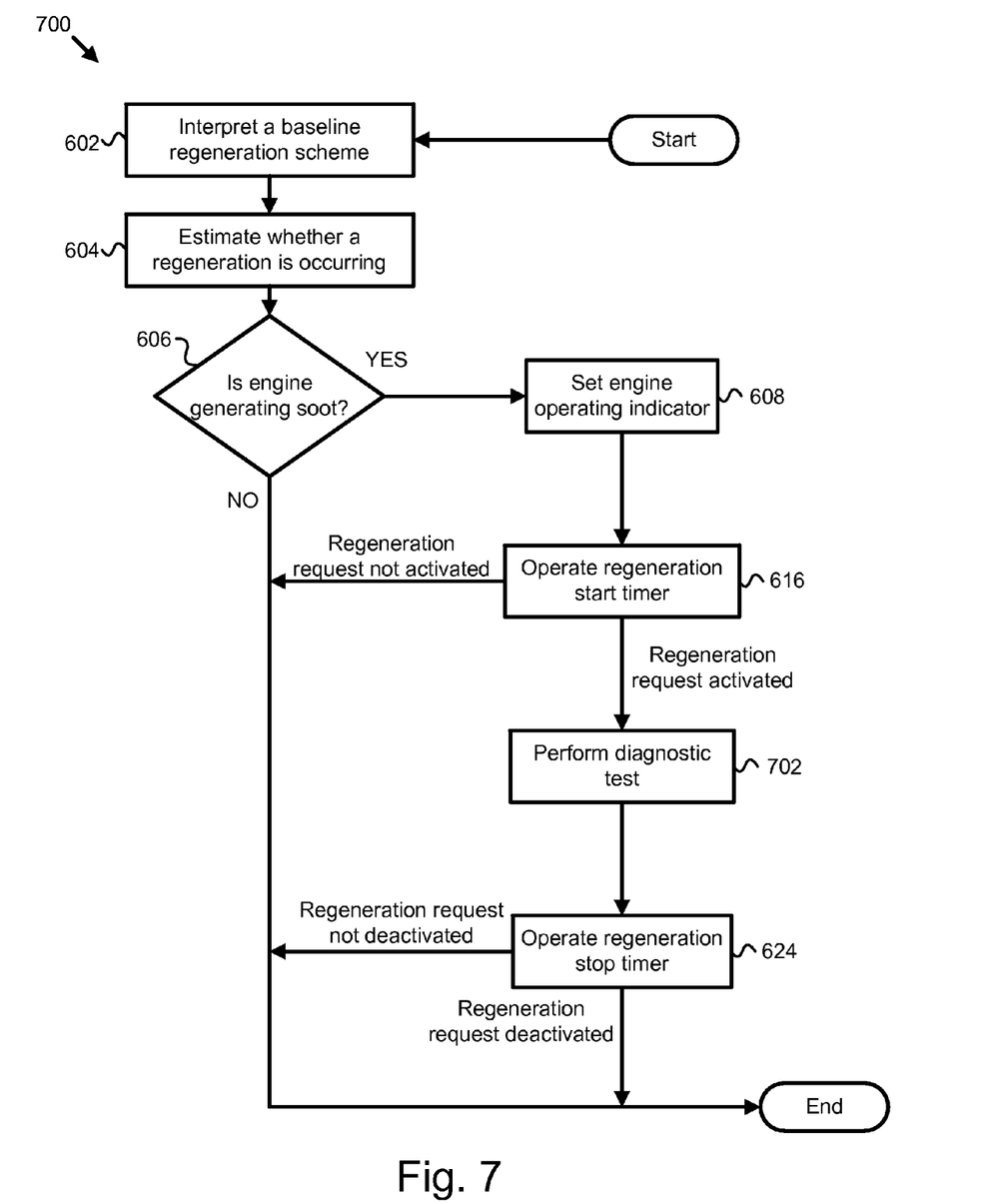
FIG. 7 is a schematic flow chart illustrating one embodiment of an alternate method for enhancing soot filter protection in accordance with the present invention.

FIG. 7 is a schematic flow chart illustrating one embodiment of an alternate method 700 for enhancing soot filter protection in accordance with the present invention. The embodiment shown for the alternate method 700 is identical to the embodiment shown for the method 600, except that the alternate method 700 may include the diagnostic tool 220 performing 702 a diagnostic test. The diagnostic test may comprise the fuel dosing module 222 checking for a fuel doser operation, the catalyst test module 224 checking a catalytic component for an expected temperature rise, and/or the soot verification module 226 verifying a soot filter 126 expected soot loading based on an observed temperature rise 230 and the set of current soot filter conditions 228.

Figure 8:
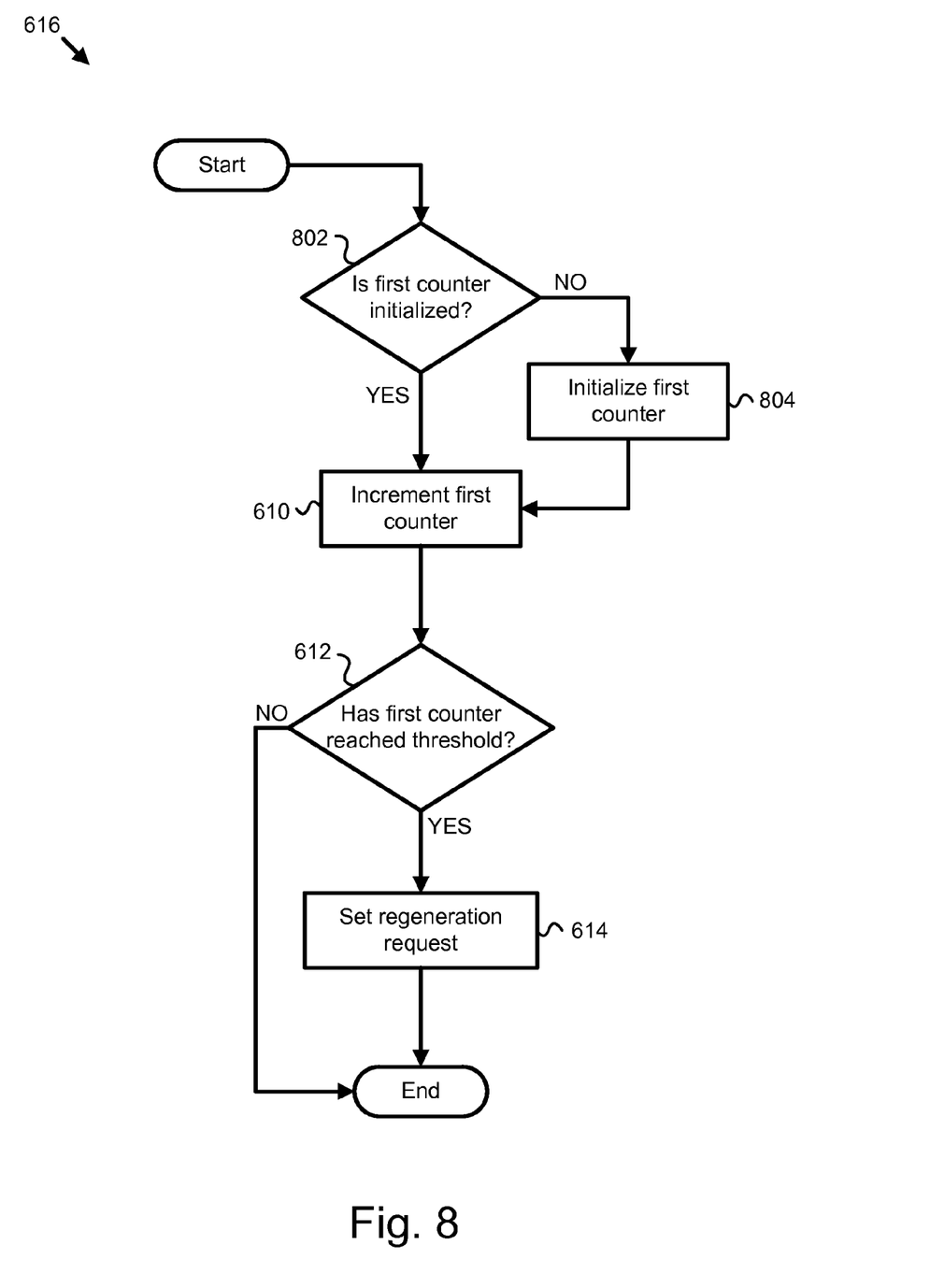
FIG. 8 is a schematic flow chart illustrating one embodiment of a method to operate a regeneration start timer in accordance with the present invention.

FIG. 8 is a schematic flow chart illustrating one embodiment of a method to operate a regeneration start timer 616 in accordance with the present invention. The operation of the regeneration start timer 616 may begin with the regeneration-start timing module 206 checking 802 whether the first counter 406 is initialized. If the first counter 406 is not initialized, the regeneration-start timing module 206 may initialize 804 the counter 406 to a first counter initialization value 408. The operation of the regeneration start timer 616 may then proceed as shown in FIG. 6.

Figure 9:
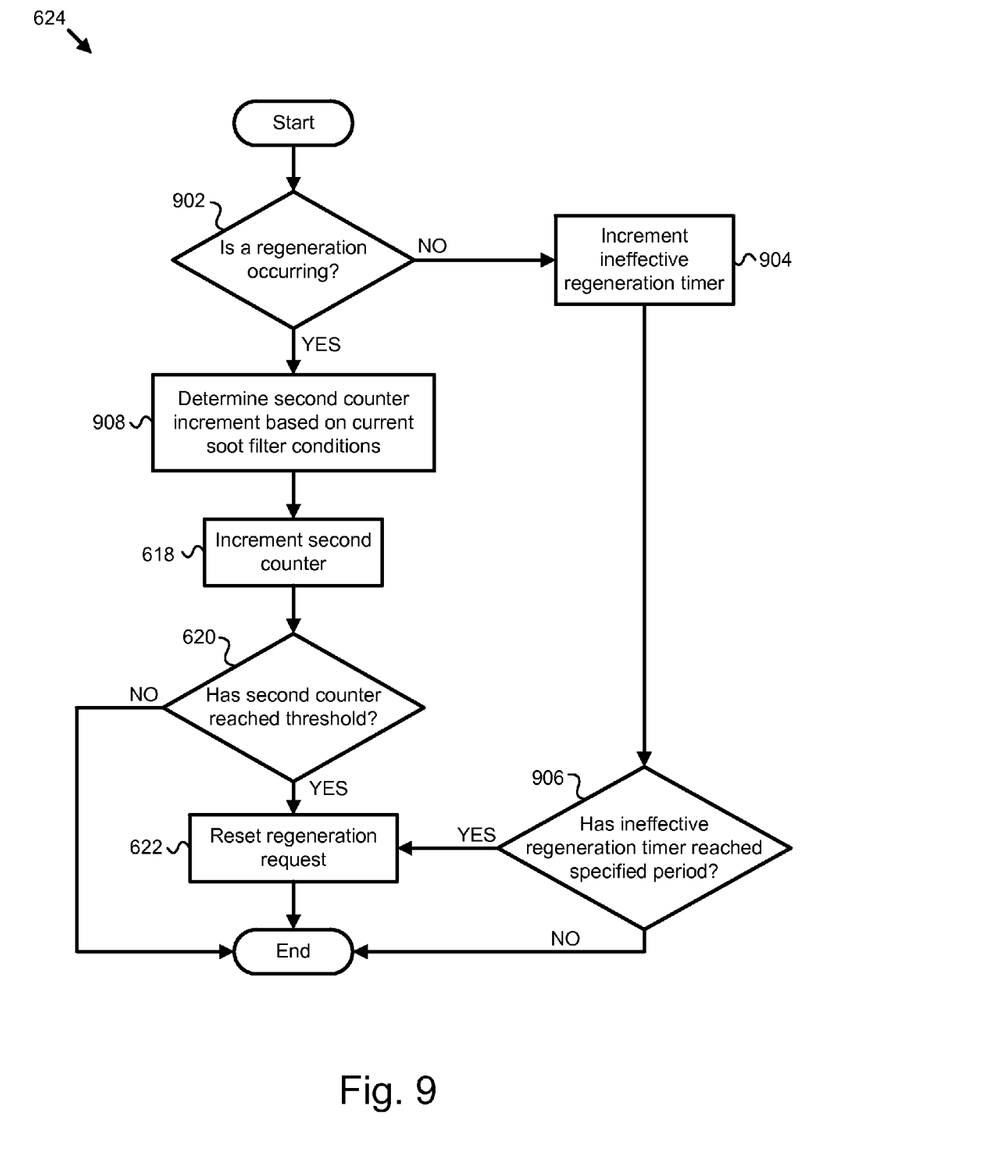
FIG. 9 is a schematic flow chart illustrating one embodiment of a method to operate a regeneration stop timer in accordance with the present invention.

FIG. 9 is a schematic flow chart illustrating one embodiment of a method to operate a regeneration-stop timer 624 in accordance with the present invention. The operation of the regeneration-stop timer 624 may begin with the regeneration-stop timing module 208 checking 902 whether a regeneration is occurring. If a regeneration is not occurring, the regeneration-stop timing module 208 may increment 904 an ineffective regeneration timer. The ineffective regeneration timer may begin set at a value of the ineffective regeneration timer from a previous execution of the operation 624. The regeneration-stop timing module 208 may then check 906 if the ineffective regeneration timer has reached a specified period. If the ineffective regeneration timer has reached the specified period, the regeneration-stop timing module 208 may reset 622 the regeneration request.

The specified period of the ineffective regeneration timer is designed to prevent the application from continually attempting a regeneration at an operating condition where a successful regeneration is not possible, and thereby degrading performance and fuel economy. Therefore, the selection for the specified period is a marketing decision driven by the needs of the application. In embodiments involving over the road hauling trucks, specified periods of about two hours have been found to be acceptable for some applications. In applications where fuel economy and performance impact from regeneration attempts are not a concern, the specified period should be set to a very long time so the protective regeneration is never bypassed. It is within the skill of one in the art to weigh the costs and benefits of a particular application and determine an appropriate ineffective regeneration timer specified period for the particular application.

The regeneration-stop timing module 208 may determine 908 a second counter increment based on the current soot filter conditions 228. This allows the regeneration-stop timing module 208 to enforce a longer or shorter protective regeneration event if a particular regeneration has current soot filter conditions 228 consistent with a slower or faster regeneration. Further, the regeneration-stop timing module 208 can increment the second counter 418 with a negative value based on the current soot filter conditions 228. For example, if the engine 102 is producing more soot than is being regenerated, the regeneration-stop timing module 208 may increment the second counter 418 with a negative value to force the protective regeneration to later oxidize the excess soot before stopping the protective regeneration event.

The regeneration-stop timing module 208 may then increment 618 the second counter 418, and check 620 if the second counter 418 has reached a second threshold. If the second counter 418 has reached the second threshold, the regeneration-stop timing module 208 may reset 622 the regeneration request.

From the foregoing discussion, it is clear that the invention provides a system, method, and apparatus to enhance soot filter protection. The invention overcomes previous limitations in the art by requesting additional soot regenerations to eliminate soot that may get missed under presently available regeneration schemes. Further, the invention provides diagnostic opportunities in systems where they may not be generally available, and the invention provides for a protective soot estimate under conditions known in the present art to be susceptible to soot underestimation. All of the functions of the invention work together to reduce the chance of an uncontrolled regeneration event and subsequent soot filter damage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for enhancing soot filter protection, the apparatus comprising:
    an operating detection module configured to detect an operating condition of an internal combustion engine, the detected operating condition being associated with a soot generation rate generated by the internal combustion engine, and set an engine operating indicator if the detected operating condition is above a threshold value associated with a threshold soot generation rate;
    a regeneration-start timing module configured to increment a first counter based on the engine operating indicator, and to set a regeneration request indicator when the first counter reaches a first threshold;
    a regeneration-stop timing module configured to increment a second counter based on the set regeneration request indicator, and to reset the regeneration request indicator when the second counter reaches a second threshold; and
    a regeneration request module configured to request a regeneration event based on the regeneration request indicator.

2. The apparatus of claim 1, further comprising a baseline regeneration module configured to interpret a baseline regeneration scheme, wherein the regeneration-staff timing module is further configured to increment the first counter based on the baseline regeneration scheme.

3. The apparatus of claim 1, wherein the first counter comprises a first timer, and wherein the second counter comprises a second timer.

4. The apparatus of claim 2, further comprising a secondary protection module configured to use a sensor-based soot load estimate if:
    the baseline regeneration scheme comprises a mixed soot load estimate comprising a model and a sensor; and
    the sensor-based soot load estimate indicates a higher soot loading than the mixed soot load estimate comprising a model and a sensor.

5. The apparatus of claim 4, wherein using a sensor-based soot load estimate comprises one of overriding a soot load estimate value and setting a sensor trust factor to a relatively high value.

6. The apparatus of claim 1, further comprising a regeneration estimation module configured to estimate whether a set of current soot filter conditions indicate that a regeneration is occurring, wherein the regeneration-start timing module is further configured to increment the first counter with a first negative value when the regeneration estimation module estimates a regeneration is occurring, and to increment the first counter with a first positive value when the regeneration estimation module estimates a regeneration is not occurring.

7. The apparatus of claim 6, wherein the first negative value comprises a value calculated from the set of current soot filter conditions.

8. The apparatus of claim 6, wherein the regeneration-start timing module is further configured to initialize the first counter such that an elapsed time is relatively short for the first time the regeneration-staff timing module sets the regeneration request indicator.

9. The apparatus of claim 6, wherein the regeneration-start timing module is further configured to initialize the first counter such that an elapsed time is relatively long for the first time the regeneration-start timing module sets the regeneration request indicator.

10. The apparatus of claim 6, wherein the set of current soot filter conditions comprise a threshold oxygen level, and a peripheral temperature estimate.

11. The apparatus of claim 10, wherein the set of current soot filter conditions further comprise a peripheral soot concentration estimate.

12. The apparatus of claim 1, further comprising a regeneration estimation module configured to estimate whether a set of current soot filter conditions indicate that a regeneration is occurring, wherein the regeneration-stop timing module is further configured to increment the second counter with a second positive value when the regeneration estimation module estimates a regeneration is occurring, and to increment the second counter with a second negative value when the regeneration estimation module estimates a regeneration is not occurring.

13. The apparatus of claim 12, wherein the second positive value comprises a value calculated from the set of current soot filter conditions.

14. The apparatus of claim 12, wherein the set of current soot filter conditions comprise a threshold oxygen level, and a peripheral temperature estimate.

15. The apparatus of claim 14, wherein the set of current soot filter conditions further comprise a peripheral soot concentration estimate.

16. A computer program product comprising a computer readable medium having computer usable program code programmed to enhance soot filter protection, the programming product having operations comprising:
   interpreting a baseline regeneration scheme;
   estimating whether a set of current soot filter conditions indicate that a regeneration is occurring;
   setting an engine operating indicator if an estimated soot generation rate generated by an internal combustion engine is above a threshold soot generation rate;
   incrementing a first counter based on the baseline regeneration scheme and the engine operating indicator;
   setting a regeneration request indicator when the first counter reaches a first threshold;
   incrementing a second counter when the regeneration request indicator is active, wherein the increment value for the second counter is based on whether a regeneration is occurring; and resetting the regeneration request indicator when the second counter reaches a second threshold.

17. The computer program product of claim 16, further comprising resetting the regeneration request indicator when the regeneration request indicator is active, a regeneration is not occurring, and a specified period of time elapses.

18. The computer program product of claim 16, further comprising performing a diagnostic test when the regeneration request indicator is set, wherein performing a diagnostic test comprises at least one member selected from the group consisting of:
   checking a fuel doser operation;
   checking a catalytic component for an expected temperature rise; and
   verifying a soot filter expected soot loading based on an observed temperature rise and the set of current soot filter conditions.

19. The computer program product of claim 16, further comprising initializing the first counter such that an elapsed time is relatively short for the first time the regeneration request indicator is set.

20. The computer program product of claim 16, further comprising initializing the first counter such that an elapsed time is relatively long for the first time the regeneration request indicator is set.

21. The computer program product of claim 16, wherein the set of current soot filter conditions comprise a soot filter temperature threshold and an oxidizing agent threshold, wherein the oxidizing agent comprises one of nitrogen oxide and oxygen.

22. The computer program product of claim 16, wherein the increment value for the second counter is further based on the set of current soot filter conditions.

23. The computer program product of claim 22, wherein the set of current soot filter conditions comprises at least one member selected from the group consisting of the soot filter temperature, the soot filter periphery temperature, a soot loading estimate, and an oxidizing agent concentration, wherein the oxidizing agent comprises one of nitrogen oxide and oxygen.

24. A system for enhancing soot filter protection, the system comprising:
   an internal combustion engine;
   an aftertreatment system fluidly coupled to the internal combustion engine, the aftertreatment system comprising a soot filter;
   a soot filter protection tool comprising at least one of a protective regeneration timer and a protective soot estimator;
   wherein the protective regeneration timer comprises an operating detection module configured to set an engine operating indicator if an internal combustion engine is operating such that a threshold amount of soot is being generated, a regeneration-start timing module configured to increment a first counter based on the engine operating indicator, and to set a regeneration request indicator when the first counter reaches a first threshold, a regeneration-stop timing module configured to increment a second counter based on the set regeneration request indicator, and to reset the regeneration request indicator when the second counter reaches a second threshold, and a regeneration request module configured to request a regeneration event based on the regeneration request indicator; and
   wherein the protective soot estimator comprises a secondary protection module configured to use a sensor-based soot load estimate if the baseline regeneration scheme comprises a mixed soot load estimate comprising a model and a sensor and the sensor-based soot load estimate indicates a higher soot loading than the mixed soot load estimate comprising a model and a sensor.

25. The system of claim 24, wherein the protective regeneration timer further comprises a regeneration estimation module configured to estimate whether a set of current soot filter conditions indicate that a regeneration is occurring, wherein the regeneration-stop timing module is further configured to increment the second counter with a second positive value when the regeneration estimation module estimates a regeneration is occurring, and to increment the second counter with a second negative value when the regeneration estimation module estimates a regeneration is not occurring.

26. The system of claim 25, wherein the internal combustion engine comprises an engine controller configured to communicate with the soot filter protection tool, and wherein the engine controller is further configured to provide at least one of a mixed soot load estimate, and upstream conditions related to the set of current soot filter conditions to the soot filter protection tool.

* * * * *